Sept. 4, 1951 A. N. GOLDSMITH 2,566,830

CABINET FOR TELEVISION RECEIVERS

Filed Oct. 12, 1946 3 Sheets-Sheet 1

INVENTOR
ALFRED N. GOLDSMITH
BY H. S. Grover
ATTORNEY

CABINET FOR TELEVISION RECEIVERS

Filed Oct. 12, 1946 3 Sheets-Sheet 2

INVENTOR
ALFRED N. GOLDSMITH
BY
N. S. Brown
ATTORNEY

Sept. 4, 1951 A. N. GOLDSMITH 2,566,830

CABINET FOR TELEVISION RECEIVERS

Filed Oct. 12, 1946 3 Sheets-Sheet 3

INVENTOR
ALFRED N. GOLDSMITH
BY H. S. Grover
ATTORNEY

Patented Sept. 4, 1951

2,566,830

UNITED STATES PATENT OFFICE 2,566,830

CABINET FOR TELEVISION RECEIVERS

Alfred N. Goldsmith, New York, N. Y., assignor to Radio Corporation of America, New York, N. Y., a corporation of Delaware Application October 12, 1946, Serial No. 703,081

11 Claims. (Cl. 178—7.5)

The present invention relates to television receivers, and more particularly to the image producing components to be associated with a cabinet or housing for the image-producing elements of such receivers.

It was formerly customary to design television receivers of the so-called reflector-type with a mirror into which an observer looked to view the television image created upon the image producing tube. It has heretofore been the practice, in many instances, to place this mirror on the lower surface of the lid of the cabinet containing the television apparatus. Then, when the lid was raised so as to be in a suitable position whereby an observer would view the mirror, such as, for instance, in a location where the mirror formed an angle of approximately 45° with both the top surface of the cabinet and with the target or screen area of the cathode ray tube, the image on the target area of the image producing tube could readily be created. A system of this character usually was such that the cathode ray image producing tube was positioned with its longitudinal axis substantially vertical, so that the luminescent or fluorescent target screen of the tube was in an approximately horizontal plane. The Zworykin Patent No. 1,870,702, granted August 9, 1932 particularly exemplifies this construction.

Arrangements such as the above provided observers with an image which was reasonably clear and undistorted, but, at the same time, included inherent disadvantages. One of these resided in the fact that, since the mirror was raised together with the cabinet lid, the location of the observed image tended to become somewhat contingent upon the mirror angle so that the same viewing angle was not equally suited to all of tall persons, persons of below-average stature, to those seated on relatively low chairs and those seated upon higher chairs. This resulted in a feeling of fatigue by persons viewing the television image for relatively long periods of time, much in the same manner, although not necessarily to the same degree, as that experienced by persons sitting in the first few rows of a motion picture house in which the screen is at some height above the floor level.

The preceding arrangement possessed another disadvantage in that the mirror was fixed in position with respect to the contours of the cabinet, thereby permitting little flexibility in the placement of the cabinet in rooms of various sizes, or in the placing of chairs within the room for the convenience of observers. A further, and perhaps less important disadvantage, was that the raising of the mirror to viewing position precluded the placing of objects, such, for example, as vases, flowers, or other ornaments on the cabinet top unless these objects were removed each time that the lid was raised. Moreover, since the cabinet top was of necessity rather low in order that the mirror height be not too excessive when the lid was raised, this prohibition against the semi-permanent placing of decorative objects on the cabinet top tended in some cases to prevent the television cabinet from harmonizing with the remainder of the room furniture.

In recognition of the above disadvantages, attempts have been made to construct a television receiver cabinet in which the luminescent screen of the cathode ray tube is viewed directly. One such design includes a cabinet having an aperture in the front wall thereof, the cathode ray tube being mounted with its longitudinal axis horizontal, so that the luminescent target or screen of the tube is substantially vertical and is enclosed within, and framed by, the opening in the cabinet wall. With such an arrangement, the lid of the cabinet need not be raised, and some of the disadvantages mentioned above with respect to prior designs are eliminated.

However, receiver cabinets of the latter type require that the cathode ray tube be placed with its major axis substantially parallel to the line of sight of the observer. Since many cathode ray tubes of the direct-viewing type are of considerable length, this means that the depth of the cabinet is frequently greater than is otherwise required. Furthermore, the tube is permanently positioned within the cabinet, and it frequently happens that due to the particular dimensions of the cabinet itself, the target or screen area of the cathode ray tube may not be located within the room in a position which is most suitable for the optimum viewing of the image by a number of observers. In other words, an arrangement of this type possesses no more flexibility than does the design previously described in which a mirror is affixed to the cabinet top.

According to a feature of the present invention, a television receiver cabinet is provided which not only permits the observance of an image at normal height, but further permits the lid of the cabinet to remain in horizontal position at all times. Furthermore, in one modification of the invention, the cathode ray tube is positioned within the cabinet with its major axis substantially parallel to the front wall of the housing. This permits the depth of the cabinet to be considerably reduced with respect to cabinets of the type mentioned above, in which the longitudinal axis of the cathode ray tube is substantially perpendicular to this front wall.

The present invention in addition provides for a television cabinet in which maximum flexibility is attained by the use of means to permit the image to appear in a space to either side of the cabinet, as desired. This choice may be made at the time of installation of the television receiver, and is selected with regard to the configuration of the room and the placement of other furniture therein. Maximum advantage may thus be taken of the particular conditions of space available.

The present invention, accordingly, includes in one embodiment a television receiver cabinet in which the cathode ray image-producing tube is located within the upper portion of the cabinet, with its longitudinal axis in horizontal position and substantially parallel to the front wall of the cabinet. This cathode ray tube, together with any associated optical enlarging elements which may be employed, is mounted on a base which is so designed as to be readily detachable in convenient fashion, such as by the removal of screws, bolts, or other fastenings. The purpose of this demountable locating of the cathode ray tube is to permit the latter to be selectively positioned within the cabinet in such a manner that the luminescent target or screen area faces either to the right or to the left of the housing, as desired.

To permit egress of light from the luminescent target or screen, openings are provided in both the left and right side walls of the cabinet. Each of these openings is provided with a closure door. One of these doors is chosen to be semi-permanently closed. The other door is designed to be opened whenever viewing of the image is desired. The selection of which one of these doors is to be semi-permanently closed and which one is to be opened as required for viewing of the reproduced image is preferably determined at the time of installation of the cabinet.

A mirror or any suitable reflector is mounted on a panel which is inclined horizontally to the line of sight of the observers. This panel may be swung pivotally from an axis at or near the back of the cabinet, this axis lying behind, and in some cases co-planar with, the luminescent target or screen of the cathode ray tube. According to the selection of position preferably made at the time of installation of the receiver, the viewing mirror or reflector is mounted either at the back left upper portion of the cabinet or at the back right upper portion of the cabinet. In either event the viewing reflector or mirror may be swung forward to a viewing position in which it forms an angle of approximately 45° with the back wall of the cabinet.

A primary feature of the invention, in one modification, resides in the fact that this reflector or mirror and its supporting panel may be swung back from viewing position and then slidably recessed within the receiver cabinet when not in use. This is accomplished by providing the reflector or mirror supporting panel with a pair of projections respectively receivable in two parallel guides or slots mounted horizontally on the back wall of the cabinet. A further primary feature of the invention, in this modification, permits one of these closure doors to be hinged to the outer edge of the mirror-supporting panel. Accordingly, this closure door acts, when the reflector or mirror is in viewing position, as a partial shadow-box element to shield the open end of the cabinet from the undesirable effects of light arriving from an external source.

The invention further contemplates, in one modification, the use of an additional sliding panel mounted horizontally beneath the top surface of the cabinet and slidably extendable either to the left or right (according to the particular mirror mounting selected) to act as a further partial shadow-box element in conjunction with the hinged closure door above mentioned.

In a further modification, the present invention contemplates the projection of enlarged images onto a translucent screen. In this particular modification, the invention contemplates the hinging of such a translucent screen on the outer edge of the mirror-supporting panel conjointly with the closure door. This arrangement permits the translucent screen to be folded back so as to lie substantially face-to-face with the viewing reflector or mirror when it is desired to recess the mirror and screen within the receiver cabinet.

In a still further modification, the present invention contemplates the projection of images onto a screen exterior of, and physically separated from, the receiver cabinet. This modification utilizes a pair of image reflectors or mirrors from which the image is successively reflected so as to secure a relatively long projection path. Thus, with an optical system of given focal length and relative aperture, greater depth of field is secured, and the focusing of the image on the screen is made less critical than would be the case under otherwise similar conditions for a lesser distance from the objective lens to the projection screen.

Other objects and advantages in addition to the above will be apparent from the following description of preferred forms of the invention and from the drawings, in which.

Figures 4, 5:
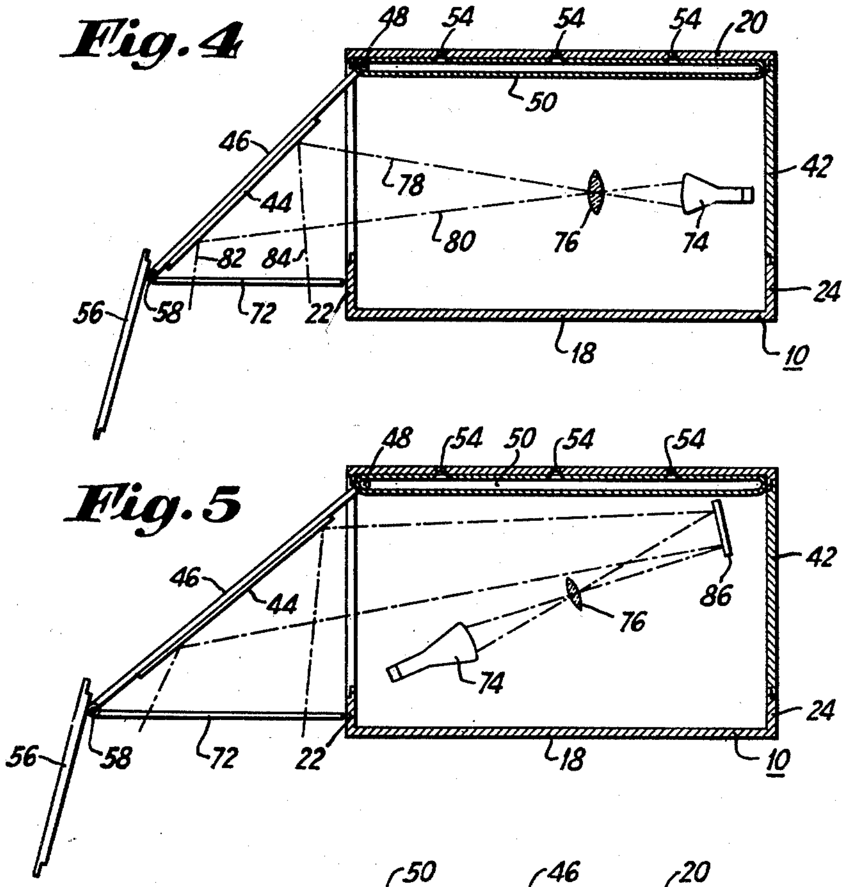
Fig. 4 is a modification of Fig. 1 in which an image is projected onto a translucent screen.
Figure 7:
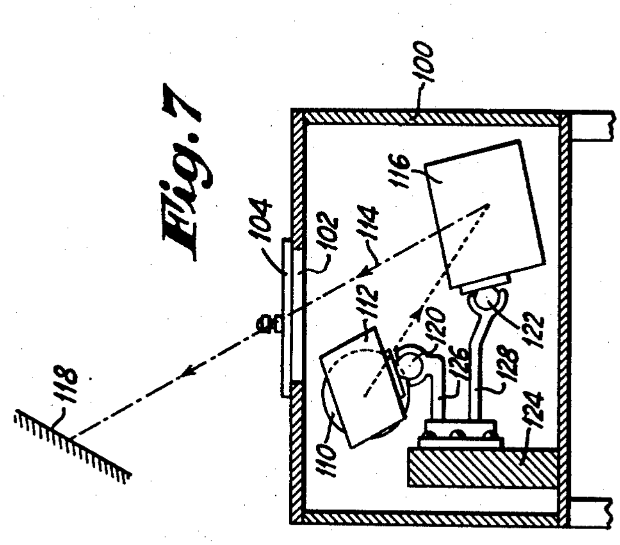
Figure 8:
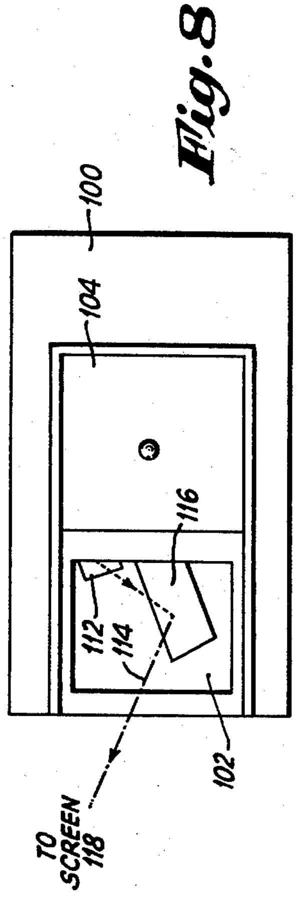
Figure 6:
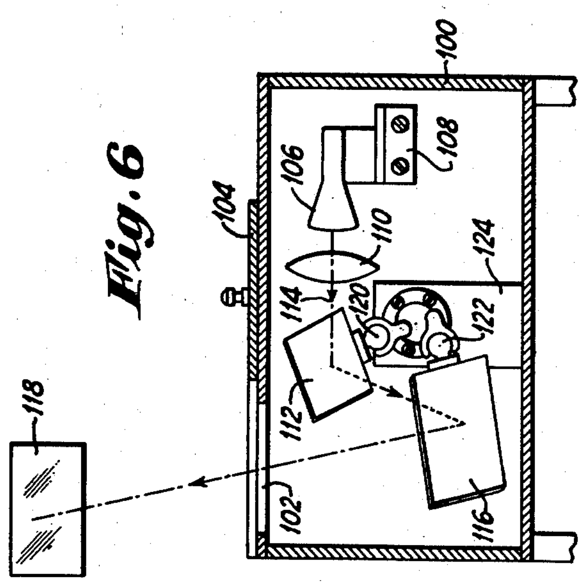

Fig. 5 is a modification of Fig. 4 in which the position of the image-producing tube is altered in order to secure an optical arrangement having a greater focal length; and Figs. 6, 7 and 8 are respectively front, end, and top views, partially in section, of an image-projection system in which the projection screen is mounted on a wall or other support exterior of, and physically separated from, the television cabinet.

Figure 1:
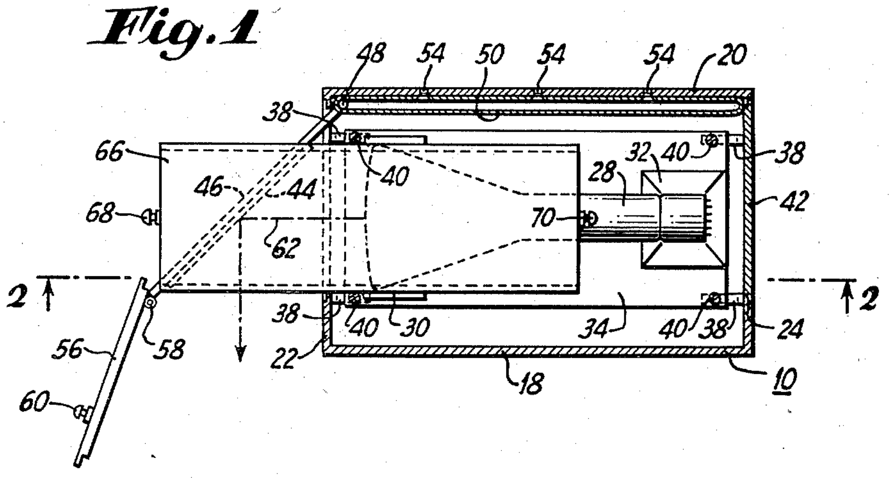
Figs. 1 and 2 are respectively top and front views, partially in section, of one form of television receiver cabinet in accordance with the present invention.
Figure 2:
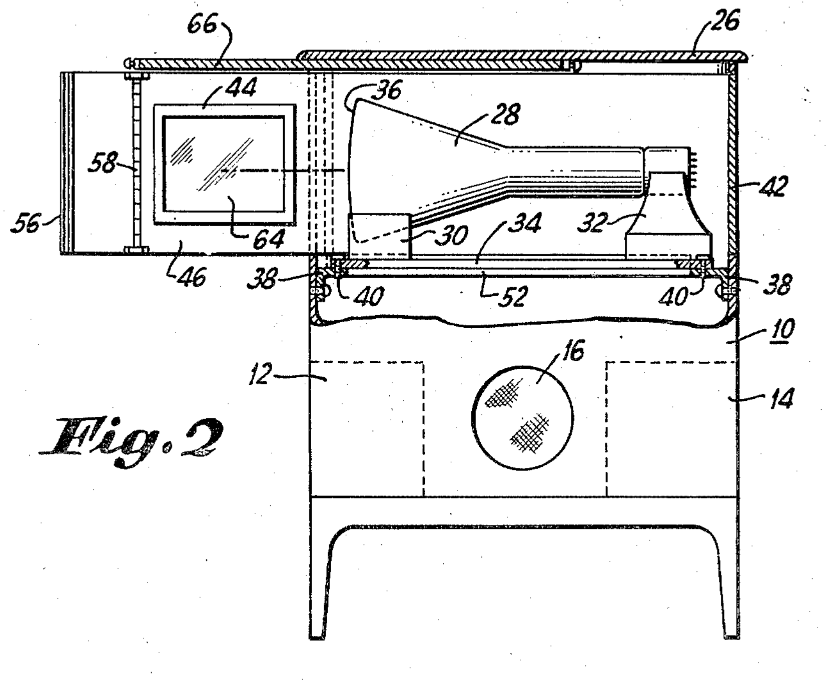

Referring first to Figs. 1 and 2, there is shown a preferred form of television receiver cabinet intended for the viewing of images produced on the luminescent target or screen area of a cathode ray tube as reflected in a mirror lying at an angle of approximately 45° both to the plane of the luminescent screen and to the line of sight of the observers. This television receiver cabinet, as shown, is of the console type and is generally designated in the drawing by the reference numeral 10. However, the arrangement in question is obviously directly applicable to table receivers as well. Within the lower portion of the cabinet 10, and in spaces such for example as those indicated at 12 and 14, a suitable television receiving apparatus may be mounted together with the power supplies therefor. A suitable speaker 16 for reproducing the concomitantly transmitted audio portion of the received television signal may also be centrally mounted, as illustrated in the lower portion of the cabinet.

The cabinet 10, as best shown in Fig. 1, is of substantially rectangular cross-section, and includes a front wall 18, a rear wall 20, and two side walls 22 and 24, respectively. The top surface of the cabinet is designated by the reference numeral 26 in Fig. 2.

A cathode ray image-reproducing tube 28 is mounted on two resilient supports 30 and 32, these supports in turn being securely affixed to a base plate 34. It will be understood that the cathode ray tube 28 is provided with the usual means for developing and deflecting a beam of electrons to scan the luminescent screen 36 of the tube in mutually perpendicular directions to trace an image raster. A showing of the electrical connections to the tube 28 has been omitted from the drawing in the interest of simplicity of illustration.

The base plate 34 on which the cathode ray tube 28 is mounted is supported within the cabinet 10 on a plurality of brackets 38. These brackets 38 are respectively screwed or bolted as shown in the drawing to the side walls 22 and 24 of the cabinet 10, and extend inwardly for a sufficient distance so that the base plate 34 may rest securely thereon. A number of removable bolts 40 clamp the base plate 34 to the brackets 38, and thus hold the cathode ray tube 28 rigidly in a selected position within the cabinet 10.

Each of the side walls 22 and 24 is provided with a substantially rectangular opening therein. Each opening is sufficiently large so that the base plate 34, together with all parts mounted thereon including the cathode ray tube 28, may be removed as a unit either to the left or to the right of the cabinet through the respective opening in side wall 22 or 24 by the simple expedient of unscrewing the bolts 40 which secure the base member 34 to the brackets 38. The reason for this removal, as will later become apparent, is to permit the cathode ray tube 28 to be positioned with its luminescent target or screen 36 facing either to the left or to the right of the cabinet 10.

When the cathode ray tube 28 has been installed so as to face one side of the cabinet 10, (the left side being chosen as an example in Figs. 1 and 2), the opening in the wall opposite to that which the cathode ray tube 28 faces is semi-permanently closed by a panel or door 42. In Figs. 1 and 2, this door 42 is shown as semi-permanently closing the opening in the side wall 24. However, it is to be understood that in case the cathode ray tube 28 is reversed in position so as to face to the right in Figs. 1 and 2 rather than to the left, then the panel 42 will close the opening in the side wall 22.

A mirror or reflecting surface 44 is supported in surface-to-surface relationship on a further panel 46. This panel 46 is provided on its rear edge with two oppositely-disposed vertical pins or projections 48, only one of these pins being visible in Figs. 1 and 2 due to the manner of taking the views. These pins or projections 48 are arranged to be slidably receivable respectively in a pair of guides 50 and 52, these guides 50 and 52 being mounted horizontally and in parallel fashion on the rear wall 20 of the cabinet 10. Each of the guides 50 and 52 extends substantially the full length of the cabinet 10 as best shown in Fig. 1, but, whereas the guide 52 may, if desired, be permanently affixed to the rear wall 20 of the cabinet, the guide 50 is secured to this rear wall 20 in such a fashion that removal of the screws 54 will permit the guide 50 to be raised and allow the pin 48 which normally rides in the guide 50 to be released.

A second closure door 56 having a function analogous to the closure door 42 is hinged to the opposite edge of the panel 46 from the projections 48. This hinging mechanism may, if desired, be of the multiple-section variety best shown by the reference numeral 58 in Fig. 2. A knob 60 is provided on the outer surface of the closure door 56.

When the reflector or mirror-supporting panel 46 is in the position shown in Figs. 1 and 2, that is, in a position where the mirror 44 lies at an angle of substantially 45° with the rear wall 20 of cabinet 10, then light from the luminescent target or screen 36 of the cathode ray tube 28 passes along a path such as indicated by the broken line 62 to the mirror 44 from which it is reflected to the eyes of the observer in such a way that the observer sees a virtual image of the tube target in the mirror. The reference numeral 64 represents the image as it appears in the mirror 44 (see Fig. 2). This image appears to lie behind the mirror.

The reflector or mirror-supporting panel 46 normally pivots around the axis of the projections 48, and is brought to a viewing position where, as previously stated, it forms an angle of approximately 45° with the rear wall 20. The hinged closure door 56 may be left in a position somewhat as best shown in Fig. 1, so that it will partially shield the mirror 44 from light which may arrive from the left of the cabinet 10. To further shield the mirror 44 from external light and to form a partial shadow-box arrangement a sliding panel 66 is provided beneath the top surface 26 of the cabinet. This panel 66 is slidably mounted beneath the surface 26 and in face-to-face relation therewith by any suitable means (not shown), such as a pair of grooves cut into the surface 26 and running lengthwise of the cabinet 10. The panel 66 is provided with two knobs 68 and 70 respectively fastened to each end thereof so that the panel may be withdrawn either to the left of the cabinet (as shown in Fig. 1) or to the right of the cabinet when the mirror assembly 44, 46 and 56 is reversed (in a manner now to be described) to appear on the right-hand side of the cabinet 10 instead of on the left hand side as shown in the drawing.

As previously stated, the screws 54 may be removed so as to permit the guide 50 to be demounted from the rear wall 20 of the cabinet 10. When this is done, the upper projection 48 on the panel 46 will be freed upon its slidable engagement with the guide 50, and the entire mirror assembly, including not only the mirror 44 but also the panel 46 and the hinged closure door 56, may be disengaged as a unit from the remainder of the cabinet assembly. Now, if the closure door 42 be removed from the opening in the side wall 24, the mirror assembly 44, 46 and 56 may be turned vertically through an angle of 180° and inserted through the opening now present in the right side wall 24. The relative position of the two projections 48 will now be reversed from that shown in Fig. 1, that is, the formerly upper projection will now be received in the lower guide 52, while the formerly lower projection (not shown due to the manner of taking the views) will be received in the upper guide 50. The guide 50 is then secured in place by a re-insertion of the screws 54. In other words, the reflector or mirror assembly 44, 46, 56, in being changed from one side of the cabinet to the other side, is merely reversed from top to bottom, and, since the assembly is substantially symmetrical in all respects, no change in its reflecting characteristics is made.

At the time the position of the mirror assembly 44, 46, 56 is reversed from left to right, it is obvious that the position of the cathode ray tube 28 must also be reversed from left to right. This is done in the manner previously set forth by removing the bolts 40 which secure the base plate 34 to the brackets 38. Since the base plate and brackets are symmetrically designed, the cathode ray tube assembly may be withdrawn from the cabinet, reversed in position, and then re-inserted in a position 180° away from the position shown in Figs. 1 and 2. The bolts 40 are then re-inserted so as to rigidly secure the assembly in its new position. The re-location of the cathode ray tube assembly in the manner just described is preferably carried out before the mirror assembly 44, 46, 56 is re-inserted in the guides 50 and 52. Of course, the closure door 42, which formerly closed the opening in the right side wall 24, is now utilized to close the opening which remains in the left side wall 22.

It has been hereinbefore stated that the cathode ray tube 28 is provided with the usual means for developing and deflecting a beam of electrons to scan the luminescent screen 36 of the tube in mutually perpendicular directions to trace an image raster. In accordance with present television practice, this deflection is normally such that the direction of horizontal, or line, scanning of the electron beam is from left to right across the screen of the cathode ray tube, as directly viewed by an observer. Hence, the video components in the received composite television signal act to modulate the electron beam so as to produce an image which is a true representation of the image being televised.

Figure 3:
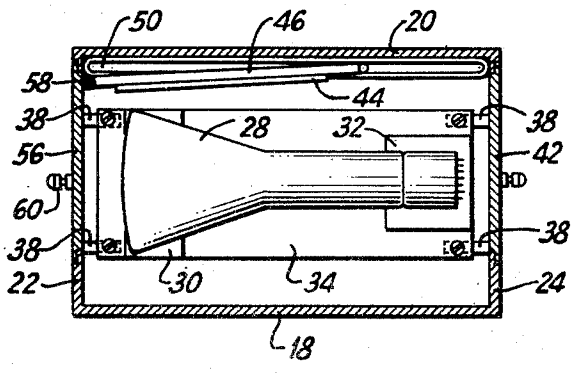
Fig. 3 is a view of Fig. 1 showing the mirror-supporting panel recessed within the cabinet.

In the modification of the present invention illustrated in Figs. 1, 2 and 3, however, an observer viewing the luminescent screen 36 of tube 28 as reflected from the mirror 44 sees an image which is reversed from left to right with respect to the orientation of the image on the screen 36. Therefore, in order that the image 64, which is the virtual image seen by an observer, be in conformity with the televised image, it is necessary that the line-scanning direction of the cathode ray beam of tube 28 be from right to left. This merely requires a reversal of the normal connections to the horizontal, or line, deflection coils of the conductors from the horizontal scanning generator (not shown). A relocation of the cathode ray tube assembly as above described so that the tube faces the opposite side wall of the cabinet 10 does not necessitate a change in these electrical connections to the horizontal deflection coils.

Fig. 3 is a view of Fig. 1 showing the reflector or mirror assembly 44, 46, 56 in recessed or non-viewing position. For convenience of illustration, the sliding horizontal panel 66 is omitted. In order that the mirror 44 may be thus recessed within the cabinet 10, the projections 48 are caused to ride in the guides 50 and 52 toward the right side wall 24. This results in the panel 46 passing through the opening in wall 22, and, when this has progressed to a point where the panel 46 is substantially in face-to-face relation with the rear wall 20 of cabinet 10, the closure door 56, which is hinged at 58 to the panel 46, will completely close the opening in side wall 22. It will be appreciated that this mode of operation is the same in principle irrespective of whether the mirror assembly 44, 46 or 56 is mounted on the left of the cabinet as shown in Figs. 1, 2 and 3, or whether it is reversed in the manner previously mentioned so as to operate from the right portion of the cabinet. In either case, when the closure door 56 is in the position shown in Fig. 3, the mirror 44 and its supporting panel 46 are completely enclosed within the cabinet, and are protected from dirt, dust and injury. It will be noted that the knob 70 on the panel 66 permits the latter to be withdrawn to the right of the cabinet so as to act, together with the closure door 56, as a partial shadow-box for the mirror 44 when the position of the latter is reversed from that shown in the drawing.

While it is preferable that the mirror 44 form an angle of approximately 45° both with the luminescent screen 36 of the cathode ray tube 28 and also with the line of sight of the observers, nevertheless it is to be understood that this angle is not critical except insofar as a radical departure therefrom may cause horizontal elongation of the reproduced image. This may of may not be objectionable, depending in part upon the characteristics of the image being viewed.

It should be emphasized in connection with the above that one of the main features of the invention resides in the fact that the entire mirror assembly, including the panel 46 with its projections 48, the mirror 44, and the closure door 56 hinged to the panel 46 by means of the mechanism 58, are arranged as a removable unit which may be detached from the cabinet 10 through the simple expedient of removing the screws 54, swung vertically through an angle of 180°, and again attached to the cabinet thereby to permit a viewing of the reproduced image from the opposite side of the cabinet 10 from that to which the mirror assembly was originally connected.

Figs. 4 and 5 are similar in many respects to the form of the invention shown in Figs. 1 through 3, except that whereas the latter figures illustrate means adapted for the direct viewing of images as reflected in a plane mirror (that is, virtual and erect images), the showing of Figs. 4 and 5 deals with the projection of enlarged images onto a translucent screen.

In carrying out this objective, the mirror assembly 44, 46 and 56 of Figs. 1 through 3 is retained substantially without change. However, an additional element is provided in the form of a translucent screen (not visible directly due to the manner of taking the plan view) mounted in a frame 72 which is hinged to one edge of the panel 46 conjointly with the closure door 56. In other words, the hinge 58 in Figs. 4 and 5 pivotally supports not only the closure door 56 but also the frame 72 enclosing the translucent screen.

A cathode ray tube 74 of the projection type is shown in Fig. 4 as well as a lens 76 positioned in the optical path of the light emitted from the luminescent screen of the tube 74. It will be understood that the tube 74 and the lens 76 are preferably mounted together on the same type of reversible base fully described in connection with Figs. 1 through 3—that is, the direction of these two components may be reversed from left to right as required by a reversal of the mirror assembly 44, 46, 56 and 72. Light leaving the lens 76 passes along such paths as 78 and 80 to the mirror 44, and thence after reflection along paths such as 82 and 84, so that the image formed on the luminescent screen of the tube 74 is focused on the translucent screen mounted in the frame 72. It is, of course, assumed that the tube 74 and lens 76 are positioned on the reversible base by some suitable means (not shown), and that the translucent screen mounted in the frame 72 lies in the focal plane of the optical system.

When the arrangement of Fig. 4 is in operating position as shown in the drawing, the plane of the frame 72 makes an angle of approximately 45° with the mirror 44, and consequently lies substantially parallel to the front wall 18 of the cabinet 10. It will be appreciated that when it is desired to recess the mirror 44 within the housing, the screen 72 is folded back so as to lie substantially flat against the mirror 44, and the assembly is then actuated through the opening in the wall 22 to a position which is substantially identical in all other respects to that shown in Fig. 3. It is to be clearly understood that the entire mirror assembly of Fig. 4, including the screen frame 72, is reversible from left to right in the same manner as the structure of Figs. 1, 2 and 3 fully described above.

Fig. 5 includes many of the features of Fig. 4, except that a projection tube arrangement is illustrated which provides a longer optical path from the projection lens 76 to the translucent screen mounted in frame 72. This longer optical path is obtained through the use of an additional plane mirror 86, positioned as shown in the drawing, so that the light from the lens 76 is reflected by the plane mirror 86 prior to its reflection by the mirror 44. In this manner, an image of increased dimensions may be obtained on the screen supported by the frame 72. It will be understood, of course, that the plane mirror 86 is supported by the same reversible base upon which the tube 74 and lens 76 are mounted. Since this base has been fully described in connection with Figs. 1 through 3, it has been omitted from the description of Figs. 4 and 5.

Figs. 6, 7 and 8 show a further modification of the invention in which enlarged images of the raster traced on the tube are projected onto a screen supported externally of the television receiver cabinet. One subject of this arrangement is to secure a relatively long projection path, and thus, with a lens of given focal length and relative aperture (or with a system utilizing the so-called "Schmidt optics" principle), to secure greater depth of field and thus to make the focusing of the image upon the projection screen less critical than would be the case under otherwise similar conditions for a lesser distance from the objective lens to the projection screen.

In Figs. 6, 7 and 8 is shown a television cabinet 100 provided with an opening 102 in the top surface thereof which is adapted to be closed by a sliding panel 104. Within the cabinet 100 is an image-producing cathode ray tube 106 mounted on a suitable support 108. Light emitted from the luminescent screen of the cathode ray tube 106 passes through an objective lens 110 onto a plane mirror 112 which is so mounted as to reflect the light rays (indicated schematically by the broken line 114) at an angle to their path of incidence onto a further plane mirror 116, from which the rays are again reflected at an angle to their path of incidence through the opening 102 and onto a screen 118 mounted and supported exterior of the cabinet 100. Screen 118 may, for example, be hung on one wall of the room within which the cabinet 100 is located. It will be noted that the mirror 112 throws the image-forming beam not only downward but also outward—that is, away from the wall on which the projection screen 118 may be suspended (see Fig. 7). The screen 118 is preferably inclined at an angle, as best shown in Fig. 7, so that the surface of the screen is substantially normal to the line of sight of an observer. The beam reflected from the mirror 112 is again reflected inward and upward by the mirror 116 through the opening 102 onto the inclined projection screen 118.

The mounting means for mirrors 112 and 116 may be of any suitable type, and have been shown in Figs. 6 and 7 as consisting of two ball-and-socket joints 120 and 122, the sockets of these joints being rigidly secured to a mounting post 124 by means of two arms 126 and 128, respectively. Mirrors 112 and 116 may be manually actuated to any desired position, and, due to the frictional engagement of the elements of the ball-and-socket joints 120 and 122, the mirrors will remain in the position to which they are moved. It is to be clearly understood, however, that the mounting means 120 through 128 is purely illustrative, and that any other suitable means for positioning or adjusting the mirrors 112 and 116 within cabinet 100 may be substituted therefor, if desired.

The angular positions of the mirrors 112 and 116, in relation to the original light beam leaving the objective lens 110, and in relation to the inclined projection screen 118, may be selected so that the aspect ratio of the image on the screen 118 may be maintained reasonably close, or exactly equal, to the true aspect ratio of the projected image. The size of the mirrors 112 and 116 need only be adequate to embrace the full image-forming beam at the particular location of each mirror, and has been exaggerated in the drawing for the sake of clarity of illustration.

It should be emphasized that the invention of this modification resides primarily in the principle of utilizing a plurality of mirrors in a particular manner to direct light from an image-producing tube onto a projection screen. It is stressed that the method of mounting the mirrors (112 and 116) and their particular location with respect to the remaining elements of the optical system is purely a matter of choice. For example, instead of mounting the mirrors 112 and 116 within the same cabinet containing the cathode ray tube 106 and lens 110, it is possible to utilize an entirely separate cabinet containing these mirrors 112, 116 and mount this second cabinet in suitable relation to the cabinet 100 so that the light paths will remain as shown in Figs. 6, 7 and 8. This arrangement possesses greater flexibility than the arrangement illustrated in that it could be designed to adjoin either the left or right of the cabinet 100 containing the image-forming equipment 106, 110. Of course, the mirrors 112 and 116 in this case must be capable of adjustment within the second cabinet so as to receive light from either of two directions, according to the selective location of this second cabinet on either the left or right side of the main cabinet 100.

It is further possible to construct the cabinet 100 of Figs. 6, 7 and 8 of considerably smaller dimensions than those illustrated. In such an event, the mirrors 112 and 116 may be supported by a framework of rods or other extendable members which may be hinged or otherwise jointed as to enable the mirrors 112 and 116 to be recessed within the cabinet 100 when the device is not in operation, or moved out and snapped into position by means of indexing or registry devices when viewing of a television image is desired. Such indexing or registry devices are well known in the art, and the specific details of these devices are to be understood as forming no part of applicant's invention.

While the method of projection of an enlarged real image of the cathode-ray tube target area shown in Figs. 4, 5, 6, 7 and 8 utilizes a convergent lens system, it should be understood that the concave mirror and corrector plate assembly used in "Schmidt optics," or its equivalent, can be similarly and interchangeably used in these figures.

Having now described the invention, what is claimed is:

1. Television apparatus comprising a cabinet body member formed with an opening at one side thereof and supporting an image-producing device therewithin, a pair of parallel guides mounted horizontally on one wall of said body member, a reflecting element, a panel supporting said reflecting element, means extending from said panel and receivable in said guides whereby said panel may be slidably actuated through the opening in said body member to and from a position within said body member substantially parallel with said one wall, and a further panel hinged to said first-mentioned panel and forming a closure element for said opening when said first-mentioned panel is wholly within said body member.

2. Television apparatus according to claim 1, in which at least one of said pair of guides is detachably mounted on said wall.

3. Television apparatus according to claim 1, further comprising a third panel slidably mounted horizontally beneath the top surface of said cabinet body member and selectively extendable to partially overlie said first-mentioned panel when the latter is exterior of said body member.

4. In a cabinet for housing television apparatus, said cabinet being provided with an opening in each side thereof: an image-producing device; means for demountably supporting said image-producing device within said cabinet so that said device may selectively face the opening in either side of said cabinet; guide means supported by the rear portion of said cabinet, at least a portion of said guide means being demountable; and a reflector assembly including a first panel having extending means receivable in said guide means, a reflector supported by said first panel, and a second panel hinged to said first panel, said reflector assembly normally extending through the opening in that side of said cabinet away from that which said image-producing device faces, whereby the demounting of at least a portion of said guide means will permit the extending means of said reflector assembly to be detached from said guide means so that said reflector assembly may be withdrawn from said cabinet through said opening.

5. In a television receiver cabinet having a pair of oppositely-disposed openings in the walls thereof: an image-producing device demountably supported within said cabinet so as selectively to face either of said openings; guide means within said cabinet; a reflector element; and a panel supporting said reflector element, said panel being provided with extending means slidably receivable in said guide means when said panel is selectively partially inserted in the opening in said cabinet opposite to that faced by said image-producing device.

6. A cabinet according to claim 5, further comprising closure means for each of said openings when said panel is completely within said cabinet, one of said closure means being carried by said panel.

7. Television apparatus comprising: a cabinet body member having an image-producing device supported therewithin in such a manner that the image-produced by said device is substantially upright; a substantially planar reflecting element; a first panel supporting said planar reflecting element, said first panel being provided with a pair of vertically-disposed cam followers mounted on one edge thereof; a pair of runners horizontally secured to one of the inner surfaces of said body member and adapted to receive respectively said pair of cam followers, so that said first panel may be actuated to and from a position within said body member approximately coplanar with said one inner surface; and a second panel hinged to that edge of said first panel opposite to said pair of cam followers, whereby, when said first panel is in a position within said body member approximately coplanar with said one inner surface, said second panel forms a closure element for said cabinet.

8. A housing for an image-producing device comprising a cabinet body member having a plurality of upright walls, at least one of said walls having an opening therein, said image-producing device being positioned to project light through said opening, a reflector unit, a panel supporting said reflector unit, means within said cabinet for slidably supporting said panel so that the latter may be actuated through said opening to and from a position within said cabinet, said panel when exterior of said cabinet forming an angle of approximately 45° with the wall having said opening, and a translucent screen hinged to and carried by said panel, said screen forming an angle of approximately 45° with said reflector when said panel is exterior of said cabinet, whereby light from said image-producing device passing through said opening is reflected from said reflector unit onto said translucent screen.

9. A housing according to claim 8, in which said translucent screen may be folded into a position substantially face-to-face with said reflector.

10. A housing adapted to enclose a television receiver of the projection type comprising in combination four vertical walls, a top and a bottom, an opening in one vertical wall, parallel guide members mounted on the inside of an adjacent vertical wall, a panel, vertical projections from one side of said panel adapted to be slidably and rotatably received in said guide members, said panel being adapted to support a mirror, a hinge mounted on the other side of said panel, a translucent screen, said translucent screen being attached to said hinge so that it can be rotated into substantially face to face relationship with said panel, a closure door, said closure door being mounted on said hinge so that when said translucent screen is positioned in substantially face to face relationship with said panel and said panel is slid through said opening along said guide members the closure door closes said opening.

11. A housing adapted to enclose a television receiver of the projection type comprising in combination a chamber defined by four vertical walls, a top and a bottom, a first opening in one vertical wall, a second opening in a vertical wall opposite said first vertical wall, a demountable base plate mounted on the bottom of said chamber, said base plate being adapted to support a projection type kinescope and a lens for projecting the image formed by said kinescope, the dimensions of said base plate being such that it may pass through one of said openings, horizontal guides mounted on another vertical wall, a panel, oppositely disposed vertical projections on one edge of said panel, said projections being adapted to be rotatably and slidably received by said guide members so that said panel may be retracted into said chamber, a hinge adapted to rotate about a vertical axis mounted near the vertical edge of said panel that is remote from said projections, a closure door mounted on said hinge for rotation about a vertical axis, and a translucent screen mounted on said hinge for rotation, said screen being between said closure door and said panel.

ALFRED N. GOLDSMITH.

REFERENCES CITED

The following references are of record in the file of this patent:

UNITED STATES PATENTS

| Number | Name | Date |
|---|---|---|
| 1,827,598 | Merriman | Oct. 13, 1931 |
| 1,858,555 | Owens | May 17, 1932 |
| 2,032,116 | Conrad et al. | Feb. 25, 1936 |
| 2,119,102 | Flaherty | May 31, 1938 |
| 2,150,992 | Scott | Mar. 21, 1939 |
| 2,268,104 | Bentley | Dec. 30, 1941 |
| 2,340,762 | Lundin | Feb. 1, 1944 |
| 2,404,943 | Beshgetorr | July 30, 1946 |
| 2,438,022 | Mc D. Rundle | Mar. 16, 1948 |
| 2,446,214 | Cramer | Aug. 3, 1948 |

FOREIGN PATENTS

| Number | Country | Date |
|---|---|---|
| 111,286 | Australia | Aug. 29, 1940 |

OTHER REFERENCES

A. P. C. publication of Deserno, Ser. No. 298,906, published May 18, 1943.